United States Patent
Kitagawa et al.

(10) Patent No.: US 10,825,267 B2
(45) Date of Patent: Nov. 3, 2020

(54) CONTROL SYSTEM OF INTERNAL COMBUSTION ENGINE, ELECTRONIC CONTROL UNIT, SERVER, AND CONTROL METHOD OF INTERNAL COMBUSTION ENGINE

(71) Applicant: TOYOTA JIDOSHA KABUSHIKI KAISHA, Toyota-shi, Aichi-ken (JP)

(72) Inventors: Eiki Kitagawa, Odawara (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/591,968

(22) Filed: Oct. 3, 2019

(65) Prior Publication Data

US 2020/0143607 A1     May 7, 2020

(30) Foreign Application Priority Data

Nov. 1, 2018   (JP) ................. 2018-206562

(51) Int. Cl.
| | |
|---|---|
| *F02D 41/24* | (2006.01) |
| *G07C 5/00* | (2006.01) |
| *G05B 13/02* | (2006.01) |
| *G06N 3/04* | (2006.01) |

(52) U.S. Cl.
CPC .......... *G07C 5/008* (2013.01); *F02D 41/248* (2013.01); *F02D 41/2451* (2013.01); *G05B 13/027* (2013.01); *G06N 3/04* (2013.01); *F02D 2200/021* (2013.01); *F02D 2200/0404* (2013.01); *F02D 2200/0414* (2013.01); *F02D 2200/0614* (2013.01); *F02D 2200/0802* (2013.01); *F02D 2200/101* (2013.01); *F02D 2200/1002* (2013.01)

(58) Field of Classification Search
CPC ... G07C 5/008; F02D 41/2451; F02D 41/248; F02D 2200/021; F02D 2200/0414; F02D 2200/0802; F02D 2200/1002; F02D 2200/0614; F02D 2200/101; F02D 2200/0404; G05B 13/027; G06N 3/04
USPC .......... 123/480, 90.11, 399, 406.12; 701/103–105, 106, 115
See application file for complete search history.

(56) References Cited

U.S. PATENT DOCUMENTS 9,328,644 B2 *  5/2016  Cui .............. F01N 11/00

FOREIGN PATENT DOCUMENTS

| JP | 2012-112277 A | 6/2012 |
|---|---|---|
| JP | 2017-129039 A | 7/2017 |

* cited by examiner

*Primary Examiner* — Hai H Huynh
(74) *Attorney, Agent, or Firm* — Oliff PLC

(57) ABSTRACT

First ECUs and second ECU of a control system of an internal combustion engine is configured to: output a predicted value of an output parameter by using a learning model if actually measured values of input parameters are input; and control an internal combustion engine based on this predicted value, the first ECUs is configured to: learn a learning model; and transmit first vehicle information including a usage environment and usage state of the first vehicle and the learned learning model linked with each other, and the second ECU is configured to receive the learned learning models, and wherein the second ECU is configured to use a learned learning model linked with the first vehicle information closest to the usage environment and usage state of the second vehicle.

6 Claims, 10 Drawing Sheets

CONTROL SYSTEM OF INTERNAL COMBUSTION ENGINE, ELECTRONIC CONTROL UNIT, SERVER, AND CONTROL METHOD OF INTERNAL COMBUSTION ENGINE

FIELD

The present disclosure relates to a control system of an internal combustion engine, an electronic control unit, a server, and a control method of an internal combustion engine.

BACKGROUND

Known in the past has been the art of using a learning model learned by machine learning to control an internal combustion engine of a vehicle (for example, see PTL 1). In particular, in each model described in PTL 1, if actually measured values of a plurality of input parameters relating to operation of the internal combustion engine are input, predicted values of the output parameters such as the flow rates of the intake gas, exhaust gas, and EMIR gas are output by using a neural network.

CITATIONS LIST

[Patent Literature]
  [PTL 1] Japanese Patent Publication No. 2012-112277

SUMMARY

Technical Problem

In this regard, in a control device of an internal combustion engine using a learning model, it is assumed that learning of the learning model is performed based on teacher data acquired dining operation of the vehicle. In this case, the usage environment and usage state specific to the vehicle are reflected in the learning model after learning. As a result, in such a learning model, the error between a predicted value of an output parameter output from the learning model and the actual value of that output parameter (below, referred to as "prediction error") is reduced. By using such a learning model, the internal combustion engine is more suitably controlled.

At the time of learning of such a learning model, high load calculation using a large number of teacher data is considered necessary. For this reason, to perform learning of a learning model in a control device of an internal combustion engine, a high performance CPU etc. become necessary. However, introduction of such a high performance CPU etc. leads to an increase in the manufacturing cost. For this reason, it is assumed that control devices having learning function of learning model will be used in only some vehicles. As a result, the other vehicles will use control devices not having learning function of learning model. In those vehicles, it will be difficult to reflect the usage environment and usage state specific to those vehicles back in the learning model. Therefore, in such vehicles, it will not be possible to suitably control the internal combustion engines in accordance with the usage environment and usage state specific to those vehicles.

In view of the above technical problem, an object of the present disclosure is to enable suitable control of an internal combustion engine in accordance with a usage environment or usage state specific to a vehicle even in a vehicle using a control device not having a learning function.

Solution to Problem

The gist of the present disclosure is as follows.

(1) A control system of an internal combustion engine comprising first electronic control units mounted in a plurality of first vehicles and a second electronic control unit mounted in a second vehicle, each of the first electronic control units and the second electronic control unit including: a predicted value output part outputting a predicted value of an output parameter by using a learning model if actually measured values of input parameters are input; and an engine control part controlling an internal combustion engine based on the predicted value output from the predicted value output part, the first electronic control units further including: a learning part learning a learning model used at the predicted value output part of the first electronic control unit by using teacher data including actually measured values of the input parameters and an actually measured value of the output parameter; and a vehicle side model transmitting part transmitting first vehicle information including at least one of a usage environment and usage state of the first vehicle and the learned learning model linked with each other, and the second electronic control unit further including a model receiving part receiving the learned learning model, and wherein the predicted value output part of the second electronic control unit uses a learned learning model, linked with the first vehicle information in which at least one of the usage environment and usage state of the first vehicle is closest to at least one of the usage environment and usage state of the second vehicle, among the learned learning models learned at the learning parts of the first electronic control units.

(2) The control system of an internal combustion engine according to claim 1, wherein the control system of an internal combustion engine further comprises a server configured to be able to communicate with the first electronic control units and the second electronic control unit, the second electronic control unit further includes a model request transmitting part transmitting to the server a model request requesting the learned learning model and second vehicle information including at least one of the usage environment and usage state of the second vehicle, and the server includes: a selecting part selecting the first vehicle information in which at least one of the usage environment and usage state of the first vehicle is closest to at least one of the usage environment and usage state of the second vehicle included in the second vehicle information received from the second electronic control unit, among the first vehicle information received from the first electronic control units; and a server side model transmitting part transmitting the learned learning model linked with the selected first vehicle information to the second electronic control unit.

(3) The control system of an internal combustion engine according to claim 1, wherein the model receiving part further receives the first vehicle information from the first electronic control units, the second electronic control unit further includes a selecting part selecting the closest first vehicle information, among first vehicle information received from the first electronic control units, and the predicted value output part of the second electronic control unit uses the learned learning model linked with the selected first vehicle information.

(4) An electronic control unit mounted in a vehicle, the electronic control unit including: a predicted value output part outputting a predicted value of an output parameter by using a learning model if actually measured values of input parameters are input; an engine control part controlling an internal combustion engine based on the predicted value output from the predicted value output part; a learning part learning said learning model by using teacher data including actually measured values of the input parameters and an actually measured value of the output parameter; and a model transmitting part transmitting vehicle information including at least one of a usage environment and usage state of the vehicle and the learned learning model linked with each other.

(5) An electronic control unit used in a second vehicle of a control system of an internal combustion engine comprising electronic control units mounted in a plurality of first vehicles and an electronic control unit mounted in a second vehicle, the electronic control unit of the second vehicle comprising: a predicted value output part outputting a predicted value of an output parameter by using a learning model if actually measured values of input parameters are input; an engine control part controlling the internal combustion engine of the second vehicle based on the predicted value output from the predicted value output part; and a model receiving part receiving the learned learning models learned at the electronic control units of the plurality of first vehicles, and wherein the predicted value output part uses said learned learning model learned at the electronic control unit of the first vehicle in which at least one of a usage environment and usage state is closest to at least one of a usage environment and usage state of the second vehicle, among the learned learning models learned at the electronic control units of the plurality of first vehicles.

(6) A server configured to be able to communicate with first electronic control units mounted in a plurality of first vehicles and a second electronic control unit mounted in a second vehicle, the server is configured to: receive from the first electronic control units first vehicle information including at least one of usage environments and usage states of the first vehicles and learned learning models learned at the first electronic control units and linked with the first vehicle information; receive from the second electronic control unit a model request requesting the learned learning model and second vehicle information including at least one of a usage environment and usage state of the second vehicle; select the first vehicle information in which at least one of the usage environment and usage state of the first vehicle is closest to at least one of the usage environment and usage state of the second vehicle included in the received second vehicle information, among the received first vehicle information; and transmit the learned learning model linked with the selected first vehicle information to the second electronic control unit.

(7) A control method of an internal combustion engine in a control system of an internal combustion engine comprising first electronic control units mounted in a plurality of first vehicles and a second electronic control unit mounted in a second vehicle, the control method of an internal combustion engine comprising steps of: learning, by the first electronic control unit, learning model used at predicted value output parts of the first electronic control unit by using teacher data including actually measured values of input parameters of learning model and actually measured values of output parameters of the learning model; transmitting, by the first electronic control unit, first vehicle information including at least one of usage environment and usage state of the first vehicle and the learned learning model linked with each other; receiving, by the second electronic control unit, the learned learning model; outputting, by the second electronic control unit, a predicted value of an output parameter by using the received learned learning model if actually measured values of input parameters are input; and controlling, by the second electronic control unit, the internal combustion engine based on the output predicted value, wherein the step of outputting the predicted value uses the learned learning model, linked with the first vehicle information in which at least one of the usage environment and usage state of the first vehicle is closest to at least one of the usage environment and usage state of the second vehicle, among the learned learning models learned at the first electronic control units.

Advantageous Effects of Invention

In accordance with the present disclosure, it become possible to suitably control an internal combustion engine in accordance with a usage environment or usage state specific to a vehicle even in a vehicle using a control device not having a learning function.

DESCRIPTION OF EMBODIMENTS

Figure 1:
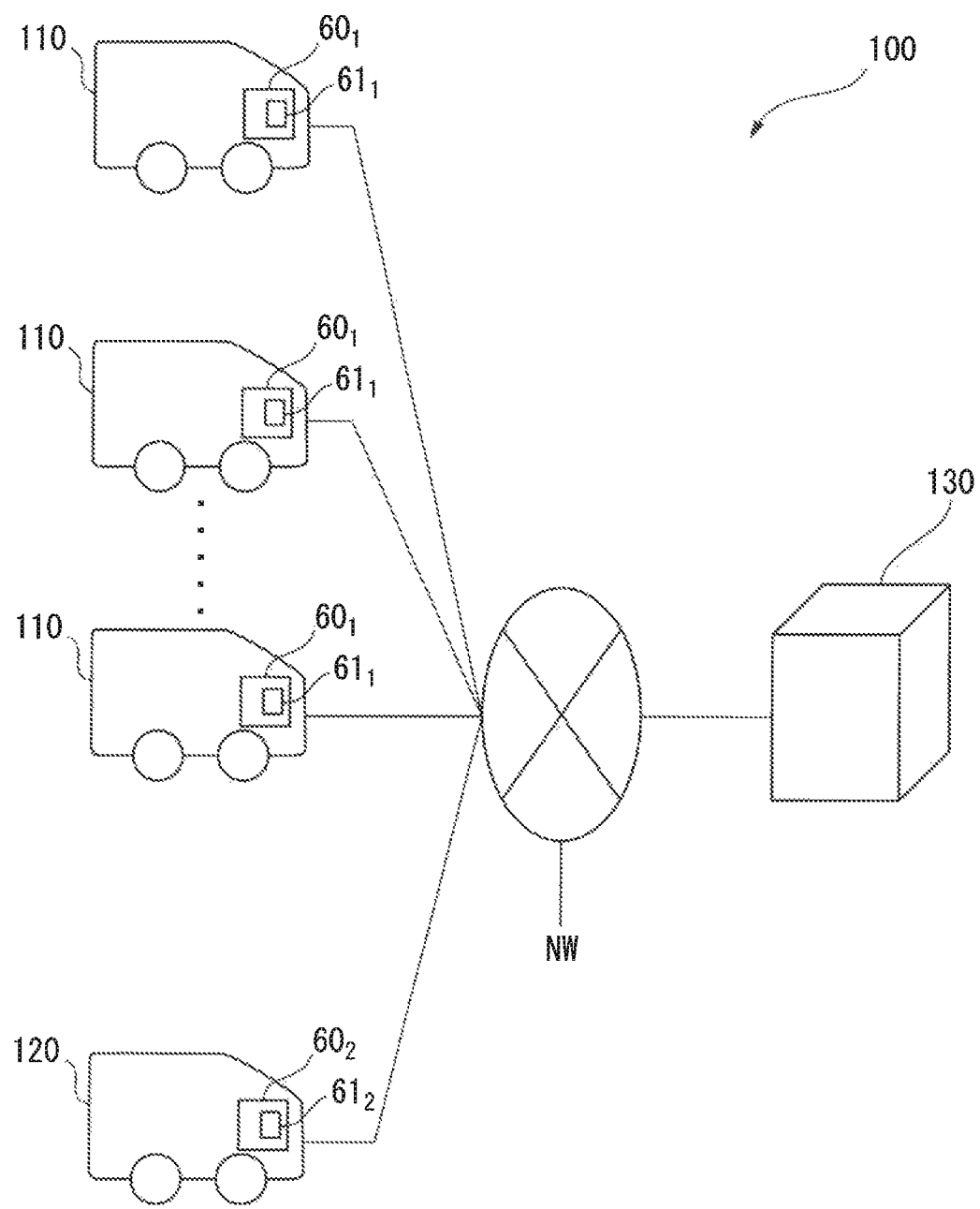
FIG. 1 is a schematic view of the configuration of a control system of an internal combustion engine according to a first embodiment.

Below, referring to the drawings, embodiments of the present disclosure will be explained in detail. Note that, in the following explanation, similar component elements will be assigned the same reference notations.

First Embodiment

Summary of System Configuration

First, referring to FIG. 1, the configuration of the control system according to a first embodiment will be explained. FIG. 1 is a schematic view of the configuration of a control system of an internal combustion engine according to the present embodiment. As shown in FIG. 1, the control system 100 according to the present embodiment includes a plurality of first vehicles 110 in each of which control device $60_1$ of an internal combustion engine is mounted, a second vehicle 120 in which a control device $60_2$ of an internal combustion engine is mounted, and a server 130. The control device $60_1$ of the internal combustion engine of the first vehicle 110 includes first electronic control unit (ECU) $61_1$ having a learning function. The control device $60_2$ of the internal combustion engine of the second vehicle 120 includes a second ECU $61_2$ not having a learning function. Therefore, the control system of an internal combustion engine 100 includes a plurality of first ECUs $61_1$ respectively mounted in the plurality of first vehicles 110 and the second ECU $61_2$ mounted in the second vehicle 120. The server 130 is configured to be able to communicate with the first ECUs $61_1$ and the second ECU $61_2$ through a network NW. In the present embodiment, the first vehicles 110 and the second vehicle 120 are the same types of vehicles. However, the first vehicles 110 and the second vehicle 120 may also be different types of vehicles so long as at least the internal combustion engines and sensors are configured the same.

Overall Configuration of Internal Combustion Engines of Vehicles

Next, the overall configuration of the internal combustion engines mounted in the first vehicles 110 according to the present embodiment will be explained. Note that, the configuration of the internal combustion engine mounted in the second vehicle 120 is similar to the configuration of the internal combustion engines mounted in the first vehicles 110, and therefore explanations will be omitted.

Figure 2:
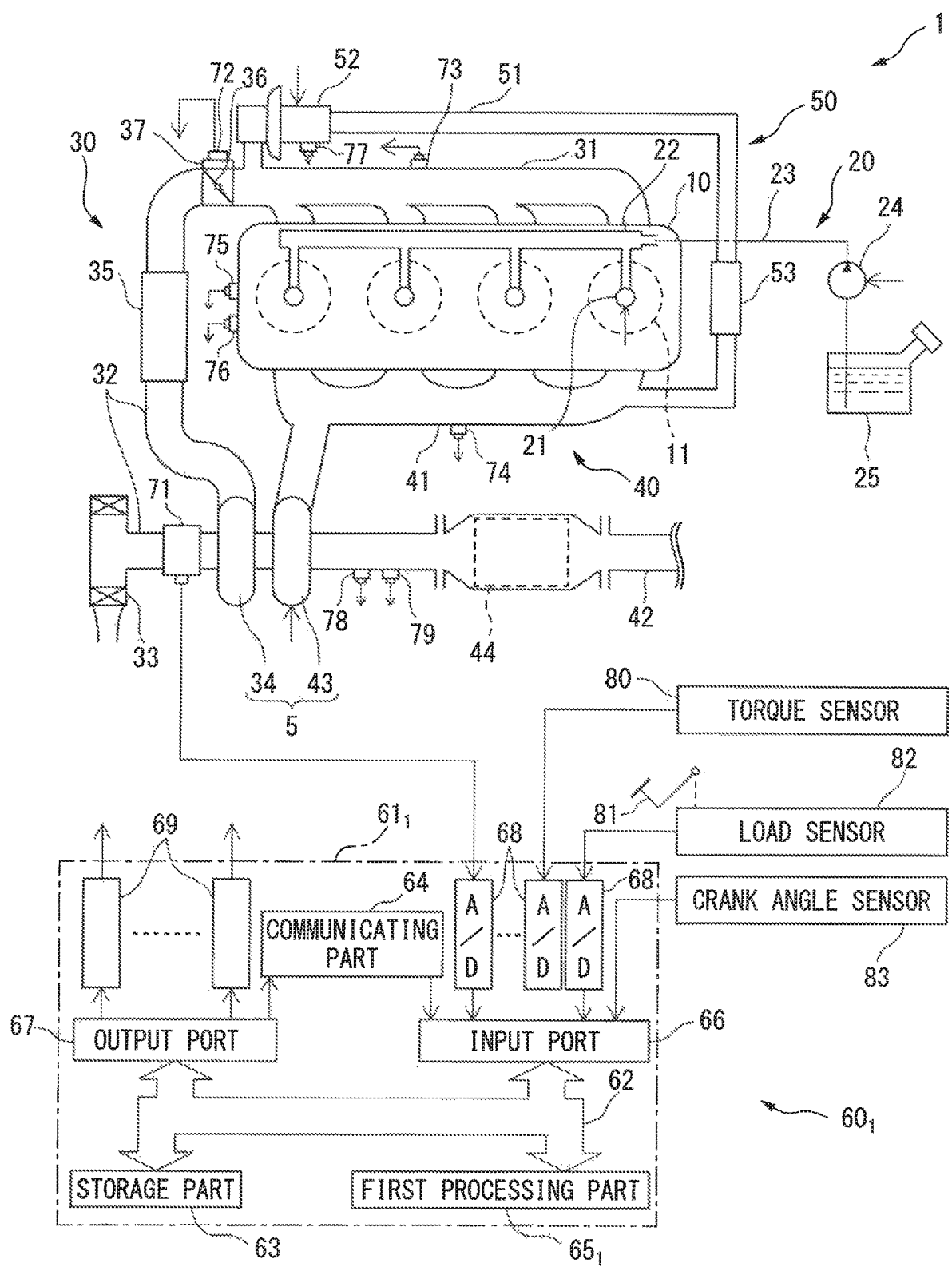
FIG. 2 is a schematic view of the configuration of an internal combustion engine mounted in a first vehicle.

FIG. 2 is a schematic view of the configuration of an internal combustion engine 1 mounted in each first vehicle 110. As shown in FIG. 2, the internal combustion engine 1 includes an engine body 10, fuel feed system 20, intake system 30, exhaust system 40, exhaust gas recirculation (EGR) system 50, and control device $60_1$ of the internal combustion engine.

The engine body 10 includes a cylinder block in which a plurality of cylinders 11 are formed, a cylinder head in which intake ports and exhaust ports are formed, and a crank case, Inside each cylinder 11, a piston is arranged. Each cylinder 11 is communicated with an intake port and exhaust port.

The fuel feed system 20 includes fuel injectors 21, a common rail 22, fuel feed pipe 23, fuel pump 24, and fuel tank 25. The fuel injectors 21 are arranged at the cylinder head so as to directly inject fuel into combustion chambers of the cylinders 11. The fuel injectors 21 are communicated with the fuel tank 25 through the common rail 22 and fuel feed pipe 23. At the fuel feed pipe 23, a fuel pump 24 is arranged for pumping out fuel from the fuel tank 25. The fuel pumped by the fuel pump 24 is supplied through the fuel feed pipe 23 to the common rail 22 and is directly injected from the fuel injectors 21 into the combustion chambers of the cylinders 11.

The intake system 30 includes an intake manifold 31, intake pipe 32, air cleaner 33, compressor 34 of the exhaust turbocharger 5, intercooler 35, and throttle valve 36. The intake port of each cylinder 11 is communicated with the air cleaner 33 through the intake manifold 31 and the intake pipe 32. Inside the intake pipe 32, the compressor 34 of the exhaust turbocharger 5 compressing and discharging intake air flowing through the inside of the intake pipe 32 and the intercooler 35 cooling the air compressed by the compressor 34 are provided. The throttle valve 36 can be turned by a throttle valve drive actuator 37 to change the opening area of the intake passage.

The exhaust system 40 includes an exhaust manifold 41, exhaust pipe 42, turbine 43 of the exhaust turbocharger 5, and particulate filter (below, simply referred to as a "filter") 44. The exhaust ports of the cylinders 11 are communicated with the filter 44 through the exhaust manifold 41 and the exhaust pipe 42. The exhaust pipe 42 is provided with the turbine 43 of the exhaust turbocharger 5 driven to rotate by the energy of the exhaust gas. If the turbine 43 of the exhaust turbocharger 5 is driven to rotate, along with this, the compressor 34 will rotate and the intake air will be compressed. In the present embodiment, the turbine 43 of the exhaust turbocharger 5 is provided with a variable nozzle. If the opening degree of the variable nozzle is changed, the flow rate of the exhaust gas supplied to the turbine blades will change and in turn the rotational speed of the turbine 43 will change. For this reason, if the opening degree of the variable nozzle is changed, the supercharging pressure will change.

The filter 44 traps fine particles in the exhaust gas. Note that, the exhaust system 40 may include another exhaust purification device instead of the filter 44 or in addition to the filter 44 if a device for purifying exhaust gas, then discharging it to the outside air. Such an exhaust purification device includes, for example, a three-way catalyst, a selection reduction type $NO_X$ catalyst for removing $NO_X$ in exhaust gas by reduction, an $NO_X$ storage reduction catalyst, an oxidation catalyst, etc.

The EGR system 50 supplies part of the exhaust gas discharged from the engine body 10 to the intake passage. The EGR system 50 includes an EGR pipe 51, EGR control valve 52, and EGR cooler 53. The EGR pipe 51 is connected with the exhaust manifold 41 and intake manifold 31 and communicates these with each other. The EGR pipe 51 is provided with the EGR cooler 53 cooling the EGR gas flowing through the inside of the EGR pipe 51. In addition, the EGR pipe 51 is provided with the EGR control valve 52 able to change the opening area of the EGR passage formed by the EGR pipe 51. By controlling the opening degree of the EGR control valve 52, the flow rate of the EGR gas made to recirculate from the exhaust manifold 41 to the intake manifold 31 is adjusted and as a result the EGR rate changes. Note that, the EGR rate is the ratio of the amount of EGR gas to the total amount of gas supplied to the inside of the combustion chambers (total of amount of fresh air and amount of EGR gas).

Note that, in the present embodiment, the exhaust turbocharger 5 is used as the supercharger for raising the pressure of the intake gas. However, if able to raise the pressure of the intake gas, an electric compressor or mechanical supercharger or other supercharger may also be used.

Configuration of Control Devices of Internal Combustion Engines of Vehicles

As shown in FIG. 2, the control device $60_1$ of an internal combustion engine of each first vehicle 110 includes a first ECU $61_1$ and various sensors. The first ECU $61_1$ is configured from a digital computer. The first ECU $61_1$ includes a storage part 63, communicating part 64, first processing part $65_1$ including a CPU or other processor, input port 66, and output port 67, which are connected with each other by a bidirectional bus 62.

The storage part 63 includes a volatile memory (for example, RAM) and nonvolatile memory (for example, ROM) and stores programs to be run at the first processing part $65_1$ and various types of data etc. to be used when the first processing part $65_1$ performs various types of processing. The communicating part 64 is connected to the input port 66 and the output port 67 of the first ECU $61_1$ and accordingly can input an input signal to first ECU $61_1$ and can also receive an output signal from the first ECU $61_1$.

The intake pipe 32 is provided with an air flow meter 71 for detecting the flow rate of air flowing through the inside of the intake pipe 32 at the upstream side in the direction of flow of intake from the compressor 34 of the exhaust turbocharger 5. The throttle valve 36 is provided with a throttle opening degree sensor 72 for detecting that opening degree (throttle opening degree). Inside the intake manifold 31, an intake temperature sensor 73 for detecting the intake temperature inside of the intake manifold 31 is provided. At the exhaust manifold 41, an exhaust temperature sensor 74 for detecting the exhaust temperature inside the exhaust manifold 41 is arranged. At the engine body 10, a water temperature sensor 75 for detecting the temperature of the engine cooling water (below, simply referred to as the "water temperature") and an oil temperature sensor 76 for detecting the temperature of the lubrication oil lubricating the frictional sliding parts of the engine body 10 (below, simply referred to as the "oil temperature") are arranged. At the EGR control valve 52, an EGR valve opening degree sensor 77 for detecting the opening degree of the EGR control valve 52 (below, referred to as the "EGR value opening degree") is arranged. Inside the exhaust pipe 42, a gas concentration sensor 78 for detecting the gas concentration in the exhaust gas and an air-fuel ratio sensor 79 for detecting the air-fuel ratio of the exhaust gas are respectively arranged.

The gas concentration sensor 78 can, for example, be an $NO_X$ sensor detecting the concentration of $NO_X$ in the exhaust gas. As the gas concentration sensor 78, in addition to an $NO_X$ sensor, in accordance with the learning model and the later explained parameters used in the learning model, for example, an HC sensor, CO sensor, $CO_2$ sensor, and other such sensors detecting the HC concentration, CO concentration, $CO_2$ concentration, etc. in the exhaust gas may be suitably used.

The output signals of the air flow meter 71, throttle opening degree sensor 72, intake temperature sensor 73, exhaust temperature sensor 74, water temperature sensor 75, oil temperature sensor 76, EGR value opening degree sensor 77, gas concentration sensor 78, air-fuel ratio sensor 79, and torque sensor 80 detecting the output torque of the internal combustion engine 1 (below, referred to as the "torque") are input through the corresponding AD converters 68 to the input port 66.

Further, a load sensor 82 generating an output voltage proportional to the amount of depression of the accelerator pedal 81 is connected to the accelerator pedal 81. The output voltage of the load sensor 82 is input through the corresponding AD converter 68 to the input port 66. Therefore, in the present embodiment, the amount of depression of the accelerator pedal 81 is used as the engine load. The crank angle sensor 83 generates an output pulse every time the crankshaft of the engine body 10 rotates by for example 10 degrees. This output pulse is input to the input port 66. At the first processing part $65_1$, the engine rotational speed is calculated from the output pulses of the crank angle sensor 83.

On the other hand, the output port 67 of the first ECU $61_1$ is connected through the corresponding drive circuits 69 to the actuators controlling the operation of the internal combustion engine 1. In the example shown in FIG. 2, the output port 67 is connected to the variable nozzle of the exhaust turbocharger 5, fuel injectors 21, fuel pump 24, throttle valve drive actuator 37, and ECR control valve 52. The first ECU $61_1$ outputs control signals for controlling these actuators from the output port 67 to control the operation of the internal combustion engine 1.

Figure 3:
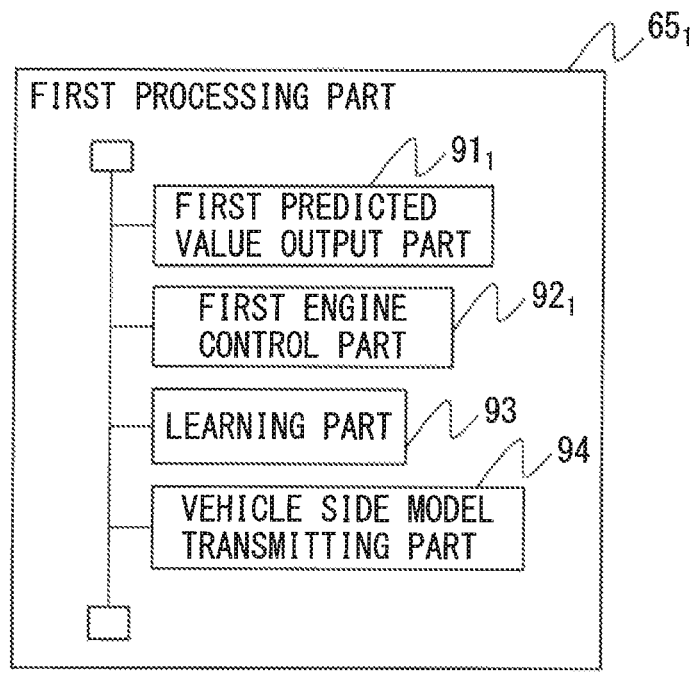
FIG. 3 is a schematic view of the configuration in a first processing part of a first electronic control unit (ECU) in the first embodiment.

FIG. 3 is a schematic view of the configuration in the first processing part $65_1$ of the first ECU $61_1$. As shown in FIG. 3, the first processing part $65_1$ includes a plurality of functional modules loaded by a program run on a processor of the first processing part $65_1$. In the present embodiment, the first processing part $65_1$ includes, as functional modules, a first predicted value output part $91_1$, first engine control part $92_1$, learning part 93, and vehicle side model transmitting part 94.

If actually measured values of the input parameters are input, the first predicted value output part $91_1$ uses the learning model to output predicted values of the output parameters. The first engine control part $92_1$ controls the internal combustion engine 1 based on the predicted values of the output parameters output from the first predicted value output part $91_1$. The learning part 93 uses teacher data including the actually measured values of the input parameters and the actually measured values of the output parameters to perform learning of the learning model used in the first predicted value output part $91_1$. The vehicle side model transmitting part 94 transmits the later explained first vehicle information and learned learning model learned at the learning part 93 through the communicating part 64 of the first ECU $61_1$ to the server 130 linked together with each other. In this way, the first ECU $61_1$ has a learning part 93, and therefore the first ECU $61_1$ has a learning function.

Next, the control device $60_2$ of the internal combustion engine of the second vehicle 120 according to the present embodiment will be explained. The control device $60_2$ of the internal combustion engine of the second vehicle 120 includes a second ECU $61_2$ and various sensors. The control device $60_2$ of the internal combustion engine of the second vehicle 12 has a configuration similar to the control device $60_1$ of the internal combustion engine of the first vehicle 110 except for the point that the second processing part $65_2$ of the second ECU $61_2$ differs from the first processing part $65_1$ of the first ECU $61_1$. Below, the control device $60_2$ of the internal combustion engine of the second vehicle 120 will be explained focusing on parts different from the control device $60_1$ of the internal combustion engine of the first vehicle 110.

Figure 4:
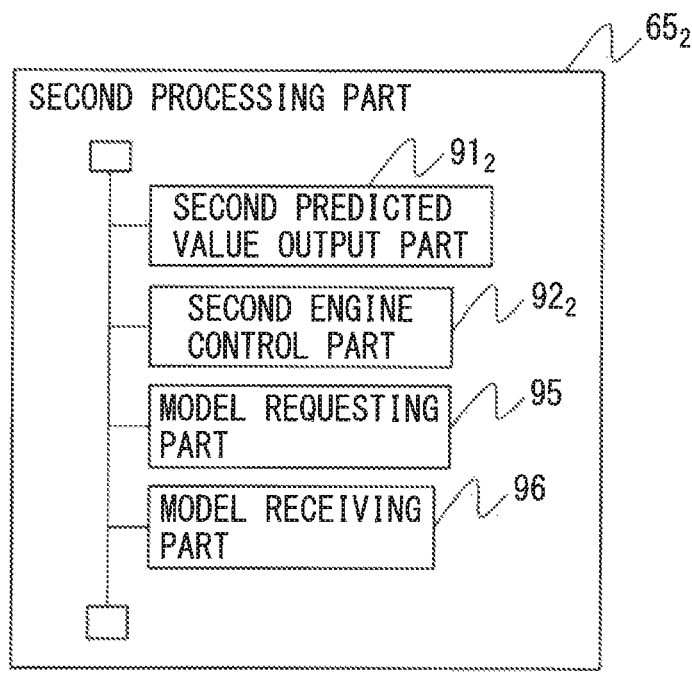
FIG. 4 is a schematic view of the configuration in a second processing part of a second ECU in the first embodiment.

FIG. 4 is a schematic view of the configuration at the second processing part $65_2$ of the second ECU $61_2$. As shown in FIG. 4, the second processing part $65_2$ includes, as functional modules, a second predicted value output part $91_2$, second engine control part $92_2$, model request transmitting part 95, and model receiving part 96.

The model request transmitting part 95 transmits a model request requesting a learned learning model and later explained second vehicle information through the communicating part 64 of the second ECU $61_2$ to the server 130. The model receiving part 96 receives the learned learning model teamed at the learning part 93 of the first ECU $61_1$ through the communicating part 64 of the second ECU $61_2$ from the server 130. In this way, the second ECU $61_2$ does not have a learning part 93, and therefore the second ECU 61₂ does not have a learning function.

Figure 5:
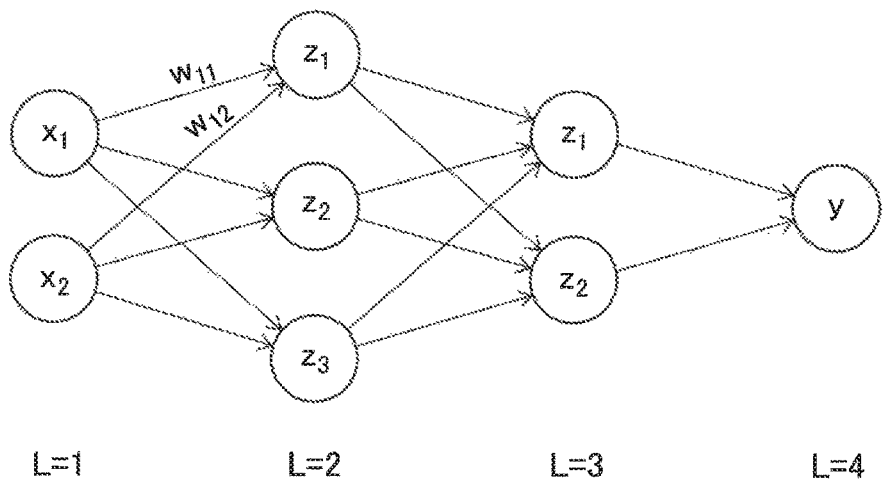
FIG. 5 is a view showing one example of a neural network.

In the embodiments of the present invention, the learning model uses a neural network. First, referring to FIG. 5, the neural network used in the learning model according to the present embodiment will be explained. FIG. 5 shows one example of a neural network. The circle marks in FIG. 5 show artificial neurons. In the neural network, these artificial neurons are usually called "nodes" or "units" (below, called "nodes"). In FIG. 5, L=1 shows an input layer, L=2 and L=3 show hidden layers, and L=4 shows an output layer. Further, in FIG. 5, $x_1$ and $x_2$ show nodes of the input layer (L=1) and output values from the nodes and "y" shows the node of the output layer and an output value from the node. Similarly, $z_1$, $z_2$, and $z_3$ of the hidden layer (L=2) show output values from the nodes of the hidden layer (L=2), and $z_1$ and $z_2$ of the hidden layer (L=3) show output values from the nodes of the hidden layer (L=3). Note that, the number of hidden layers may be made one or any other number, while the number of nodes of the input layer and number of nodes of the hidden layers may also be made any numbers. Note that, in the present embodiment, the number of nodes of the output layer may be made one node.

At the nodes of the input layer, the inputs are output as they are. On the other hand, the output values $x_1$ and $x_2$ of the nodes of the input layer are input to the nodes of the hidden layer (L=2). At the nodes of the hidden layer (L=2), the respectively corresponding weights "w" and biases "b" are used to calculate the sum input values "u". For example, a sum input value $u_k$ calculated at a node shown by $z_k$ (k=1, 2, 3) of the hidden layer (L=2) in FIG. 5 becomes as shown in the following equation (M is the number of nodes of the input layer):

[Equation 1]

$$u_k = \sum_{m=1}^{M} (x_m \cdot w_{km}) + b_k$$

Next, this sum input value $u_k$ is converted by an activation function "f" and is output from a node shown by $z_k$ of the hidden layer (L=2) as an output value $Z_k$ (=$f(u_k)$). On the other hand, the output values $z_1$, $z_2$, and $z_3$ of the nodes of the hidden layer (L=2) is input to the nodes of the hidden layer (L=3). At the nodes of the hidden layer (L=3), the respectively corresponding weights "w" and biases "h" are used to calculate the sum input values "u" ($\Sigma z \cdot w + b$). The sum input values "u" are similarly converted by an activation function "f" and output from the nodes of the hidden layer (L=3) as the output values $z_1$ and $z_2$. Note that, in the embodiments according to the present invention, as this activation function, a Sigmoid function σ is used.

On the other hand, the output values $z_1$ and $z_2$ of the nodes of the hidden layer (L=3) are input to the node of the output layer (L=4). At the node of the output layer, the respectively corresponding weights "w" and biases "h" are used to calculate the sum input value "u" ($\Sigma z \cdot w + b$) or just the respectively corresponding weights "w" are used to calculate the sum input value "u" ($\Sigma z \cdot w$). In the present embodiment, at the node of the output layer, an identity function is used as the activation function, therefore, from the node of the output layer, the sum input value "u" calculated at the node of the output layer is output as it is as the output value "y".

Learning at Neural Network

In the present embodiment, the learning part 93 of the first ECU 61₁ learns values of each weights and values of each biases in the neural network by using the error backpropagation algorithm. This error backpropagation algorithm is also known. Therefore, the error backpropagation algorithm will be simply explained in outline below. Note that, a bias "b" is one kind of weight "w". Therefore, in the following explanation, a bias "b" is deemed one type of weight "w".

Now then, in the neural network such as shown in FIG. 5, if the weights at the input values $u^{(L)}$ to the nodes of the layers of L=2, L=3, or L=4 are expressed by $w^{(L)}$, the partial differential due to the weights $w^{(L)}$ of the error function F, that is, the gradient $\partial E/\partial w^{(L)}$, is shown by the following equation (1):

[Equation 2]

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$, and therefore if $(\partial E/\partial u^{(L)}) = \delta^{(L)}$, the above equation (1) can be shown by the following equation (2):

[Equation 3]

$$\partial E/\partial w^{(L)} = \delta^{(L)} \cdot z^{(L-1)} \quad (2)$$

Here, if $u^{(L)}$ fluctuates, fluctuation of the error function E is caused through the change in the sum input values $u^{(L+1)}$ of the following layer, and therefore $\delta^{(L)}$ can be expressed by the following equation (3) (K is the number of nodes at the L+1 layer):

[Equation 4]

$$\delta^{(L)} = \left(\frac{\partial E}{\partial u^{(L)}}\right) = \sum_{k=1}^{K} \left(\frac{\partial E}{\partial u_k^{(L+1)}}\right)\left(\frac{\partial u_k^{(L+1)}}{\partial u^{(L)}}\right)(k=1, 2, \ldots, K) \quad (3)$$

where, if $z^{(L)} = f(u^{(L)})$, the input value $u_k^{(L+1)}$ appearing at the right side of the above equation (3) can be expressed by the following equation (4):

[Equation 5]

$$\text{Input value } u_k^{(L+1)} = \sum_{k=1}^{K} w_k^{(L+1)} \cdot z^{(L)} = \sum_{k=1}^{K} w_k^{(L+1)} \cdot f(u^{(L)}) \quad (4)$$

where, the first term $(\partial E/\partial u^{(L+1)})$ at the right side of the above equation (3) is $\delta^{(L+1)}$. The second term $(\partial u_k^{(L+1)})/\delta u^{(L)}$ at the right side of the above equation (3) can be expressed by the following equation (5) from the above equation (4):

[Equation 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ can be expressed by the following equation (6) from the above equations (3) to (5):

[Equation 7]

$$\delta^{(L)} = \sum_{k=1}^{K} w_k^{(L+1)} \cdot \delta^{(L+1)} \cdot f'(u^{(L)}) \quad (6)$$

That is, $\delta^{(L-1)} = \sum_{k=1}^{K} w_k^{(L)} \cdot \delta^{(L)} \cdot f'(u^{(L-1)})$ That is, if $\delta^{(L+1)}$ is found, it is possible to find $\delta^{(L)}$.

Now then, teacher data including certain input values "x" and true data "t" for the input values "x" is found. When the output value from the output layer corresponding to the input values "x" is "y", if the square error is used as the error function, the square error E is found by $E=(y-t)^2/2$. At the node of the output layer (L=4) shown in FIG. 2, the output value "y" becomes $f(u^{(L)})$, therefore, in this case, the value of $\delta^{(L)}$ at the node of the output layer (L=4) becomes like in the following equation (7):

[Equation 8]

$$\delta^{(L)} = \partial E/\partial u^{(L)} = (\partial E/\partial y)(\partial y/\partial u^{(L)}) = (y-t) \cdot f'(u^{(L)}) \quad (7)$$

In this regard, in the present embodiment, as explained above, $f(u^{(L)})$ is an identity function and $f'(u^{(L)})=1$. Therefore, $\delta^{(L)}=y-t$ and $\delta^{(L)}$ can be found.

If $\delta^{(L)}$ is found, the above equation (6) can be used to find the $\delta^{(L-1)}$ of the previous layer. The $\delta$'s of the previous layer are successively found in this way. Using these values of $\delta$'s, from the above equation (2), the partial differential of the error function F, that is, the gradient $\partial E/\partial w^{(L)}$ I can be found for the weights "w".

If the gradient $\partial E/\partial w^{(L)}$ is found, the values of the weights "w" is updated by using this gradient $\partial E/\partial w^{(L)}$ so that the value of the error function E becomes smaller. That is, learning of the weights "w" is performed. Note that, if a batch or minibatch is used as the teacher data, the error sum of squares E shown by the following equation (8) is used as the error function E. Here, N is the total number of the teacher data, "i" is a natural number of N or less (i=1, 2, . . . , N), and $y_i$ and $t_i$ are the output value and true data for the input value $x_i$:

[Equation 9]

$$\text{Error sum of squares } E = \frac{1}{N}\sum_{i=1}^{N}\frac{1}{2}(y_i - t_i)^2 \quad (8)$$

On the other hand, if successively calculating the error sum of squares for learning, the above-mentioned error sum of squares $E=(y-t)^2/2$ is used as the error function E.

Specific Example of Learning Model

Next, a specific example of the learning model using the neural network in the present embodiment will be explained. First, one example of the input parameters used in the neural network in the present embodiment will be explained. The input parameters of the learning model in the present embodiment can include two or more among the ignition timing, fuel injection amount, fuel injection timing, operating time of intake valve and operating time of exhaust value of the internal combustion engine, throttle opening degree, intake temperature, water temperature, oil temperature, EGR valve opening degree, and engine rotational speed.

Next, one example of the method of acquisition of the actually measured values of the input parameters will be explained. The ignition timing, fuel injection amount, fuel injection timing, and operating time of the intake valve and operating time of the exhaust value of the internal combustion engine are respectively obtained from the command value of each of the first ECU $61_1$ and the second ECU $61_2$. The throttle opening degree, intake temperature, water temperature, oil temperature, and EGR valve opening degree are respectively acquired from the output values of the throttle opening degree sensor 72, intake temperature sensor 73, water temperature sensor 75, oil temperature sensor 76, and EGR value opening degree sensor 77. The engine rotational speed is acquired from the calculated value of each of the first ECU $61_1$ and the second ECU $61_2$ based on the output signal of the crank angle sensor 83.

Next, one example of the output parameters used in the neural network in the present embodiment will be explained. The output parameters used in the neural network in the present embodiment can include at least one among the exhaust temperature, $NO_X$ concentration, HC concentration, CO concentration, and $CO_2$ concentration in the exhaust gas, the air-fuel ratio of the exhaust gas, and the output torque of the internal combustion engine 1.

Figure 6:
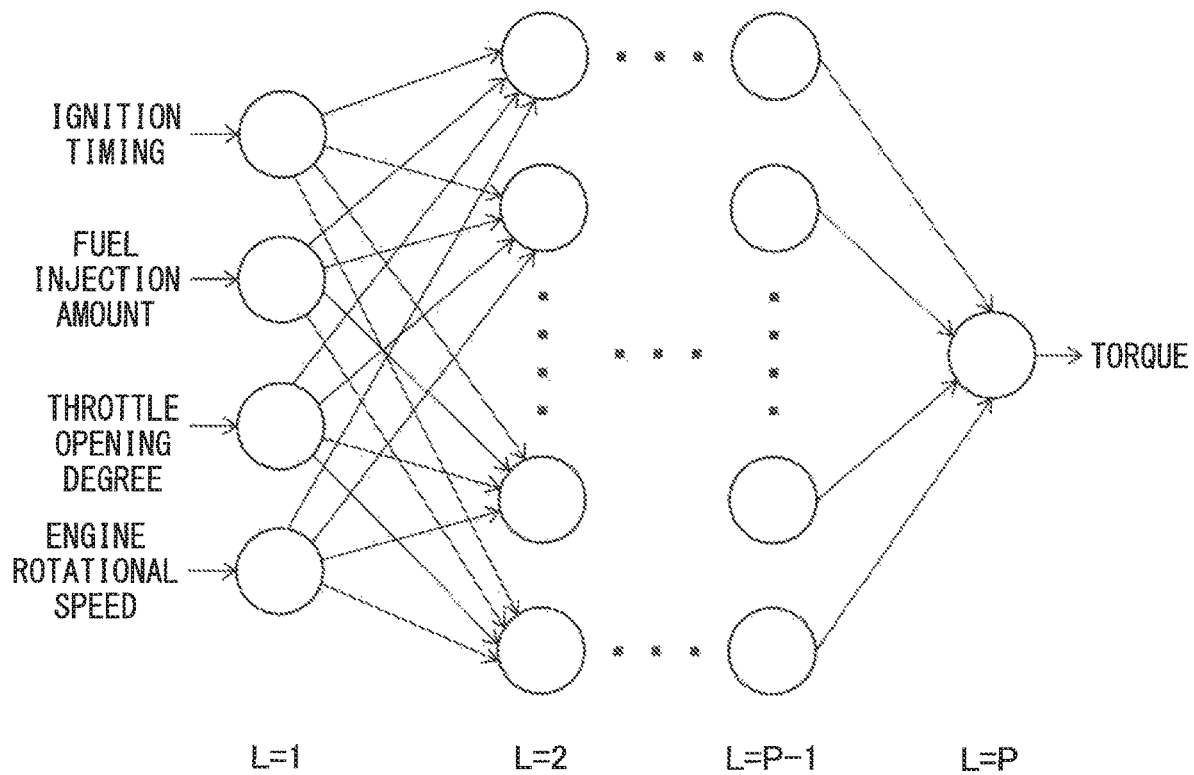
FIG. 6 is a view showing a specific example of the neural network in the first embodiment.

FIG. 6 shows a specific example of the neural network in the present embodiment. The neural network in the learning model shown in FIG. 6 uses the ignition timing, fuel injection amount, throttle opening degree, and engine rotational speed as the input parameters and the torque as the output parameter. As shown in FIG. 6, in the present embodiment, the neural network of the learning model is comprised of P layers (P is any integer of 3 or more). The numbers of nodes at the different hidden layers may be made any numbers. Further, in the neural network in the learning model shown in FIG. 6, the input layer (L=1) has four nodes corresponding to the four input parameters, but may have any number of nodes corresponding to the number of input parameters.

Summary of Control and Learning Using Learning Model

At the time of operation of the internal combustion engines 1 of the first vehicles 110 and the second vehicle 120, the actually measured values of the input parameters, that is, the actually measured values of the ignition timings, fuel injection amounts, throttle opening degrees, and engine rotational speeds are input to each of the first predicted value output part $91_1$ and the second predicted value output part $91_2$. If these actually measured values of the input parameters are input, each of the first predicted value output part $91_1$ and the second predicted value output part $91_2$ outputs the predicted values of the output parameters, that is, the predicted values of the torques by using learning models shown in FIG. 6, In the present embodiment, the predicted values of the torques are not the predicted values of the current torques (that is, the torques detected by the torque sensor 80), but are the predicted values of future torques.

In this way, each of the first engine control part $92_1$ and the second engine control part $92_2$ controls the internal combustion engine 1 based on the predicted values of the output torques output from each of the first predicted value output part $91_1$ and the second predicted value output part $91_2$. Specifically, for example, if the predicted values of the torques output from the first predicted value output part $91_1$ have become values different from the target torques set based on the engine loads etc., the target values of the control parameters (for example, the throttle opening degrees, fuel injection amounts, ignition timings, etc.) of the internal combustion engine 1 of the first vehicle 110 are changed so that the predicted values of the torques become the target torques.

On the other hand, the learning operation of the learning model is performed at the learning part 93 of the first ECU $61_1$. The learning part 93 uses the teacher data including the actually measured values of the input parameters of the learning model and the actually measured values of the output parameters of the learning model to perform learning of the learning model. The actually measured values of the input parameters are acquired in the same way as the case where they are input to the first predicted value output part $91_1$ and the second predicted value output part $91_2$. Further, when using torques as the output parameters, the actually measured values are acquired from the output values of the torque sensors 80. Note that, the second ECU $61_2$ does not have a learning function as explained above, and therefore, at the second ECU $61_2$, learning of the learning model is not performed.

Server

Figure 7:
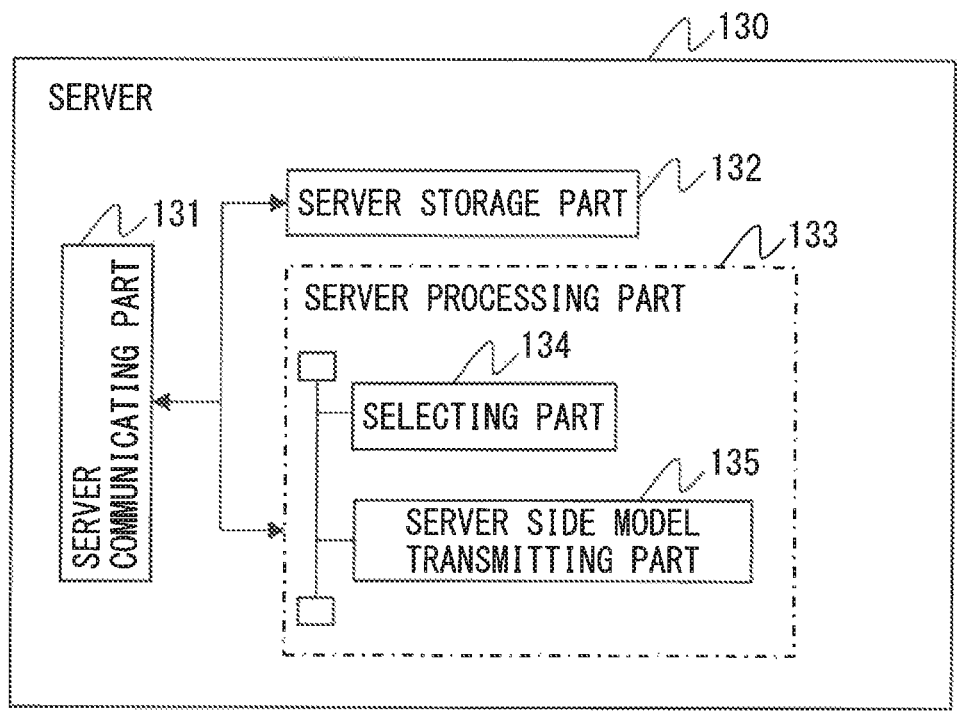
FIG. 7 is a schematic view of the configuration of a server in the first embodiment.

FIG. 7 is a schematic view of the configuration of the server 130. As shown in FIG. 7, the server 130 includes a server communicating part 131, server storage part 132, and server processing part 133 containing a CPU or other processor. These server communicating part 131, server storage part 132, and server processing part 133 are connected with each other and therefore can send and receive data between them.

The server communicating part 131 is configured to be able to communicate with the communicating parts 64 of the first vehicles 110 and second vehicle 120. The communication between the communicating parts 64 of these first vehicles 110 and second vehicle 120 and the server communicating part 131 is performed by wireless communication based on various communication standards.

The server storage part 132 includes a volatile memory (for example, RAM) and nonvolatile memory (for example, ROM) and stores programs to be rim by the server processing part 133 and various types of data etc. to be used when the server processing part 133 performs various types of processing. In the present embodiment, the server storage part 132 stores the first vehicle information and learned learning models received from the first ECUs $61_1$ through the server communicating part 131.

As shown in FIG. 7, the server processing part 133 includes, as functional modules, a selecting part 134 and server side model transmitting part 135. The selecting part 134 selects from the first vehicle information received from the respective first ECUs $61_1$ the first vehicle information in which the usage environment and usage state of the first vehicle 110 are the closest to the usage environment and usage state of the second vehicle 120 contained in the second vehicle information received from the second ECU $61_2$. The server side model transmitting part 135 transmits the learned learning model linked with the first vehicle information selected at the selecting part 134 through the server communicating part 131 to the second ECU $61_2$.

Problem

In this regard, if using a standard model learned for a representative vehicle before shipment by the manufacturer as the learning model, the usage environment and usage state of the vehicles will not be reflected back to the learning model. Therefore, if using such learning model to estimate the values of the output parameters, error may be occurred between the predicted values of the output parameters output from such learning model and the actual values of the output parameters.

Therefore, in order to reflect the usage environment and usage state of the vehicle in the weights "w" of the learning model to improve the prediction precision of the learning model, the learning part 93 of the first ECU $61_1$ uses teacher data acquired during operation of the vehicle to learn the weights "w". In this regard, however, the learning operation in such learning model is high in calculation load, and therefore high performance CPUs etc. become necessary. For this reason, the vehicle which can use control device performing such learning operation of the learning model is limited to just some of the vehicle such as the first vehicles 110. Therefore, in other vehicles using control devices not having learning functions of the learning models like the second vehicle 120, it is difficult to reflect the usage environments and usage states specific to the vehicle back to the learning model.

Use of Learning Model Learned by Control Service of Other Vehicle

Therefore, in the present embodiment, the second ECU $61_2$ of the second vehicle 120 uses a learned learning model learned at the learning part 93 of a first ECU $61_1$ of a first vehicle 110 to control the internal combustion engine 1. In particular, the second ECU $61_2$ of the second vehicle 120 uses a learned learning model, linked with first vehicle information closest to the usage environment and usage state of the second vehicle 120, among the first vehicle information including the usage environments and usage states of the first vehicles 110 transmitted from the first ECUs $61_1$ of the first vehicles 110 to control the internal combustion engine 1. Due to this, vehicles like the second vehicle 120 using control devices not having learning functions can suitably control the internal combustion engines in accordance with the usage environment or usage state of the vehicle. As a result, in such vehicles as well, prediction error of the learning model can be reduced. Below, a control system 100 of an internal combustion engine according to the present embodiment will be explained in detail.

Sequence Diagram

Figure 8:
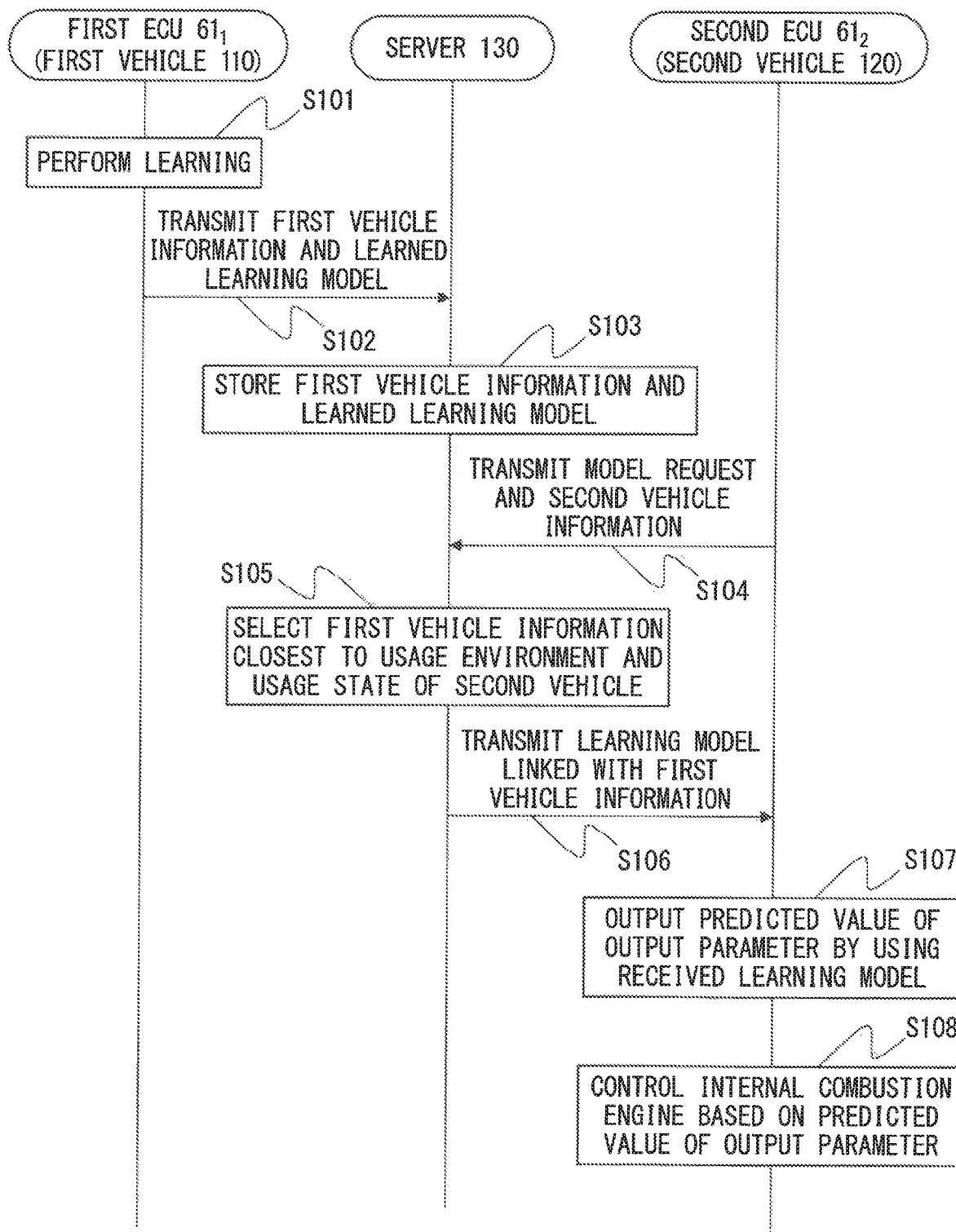
FIG. 8 is a sequence diagram showing one example of processing performed by the control system of an internal combustion engine according to the first embodiment.

FIG. 8 is a sequence diagram showing one example of the processing performed by the control system of an internal combustion engine according to the present embodiment. As shown in FIG. 8, at step S101, in the first ECU $61_1$, the learning part 93 uses teacher data including the actually measured values of the input parameters and the actually measured values of the output parameters for learning the learning model used at the first predicted value output part $91_1$. Specifically, the learning part 93 updates the weights "w" of the neural network. This learning is performed at predetermined timings after the series of teacher data (data set of teacher data) required for learning the weights or biases of the neural network during operation of the internal combustion engine is acquired. After that, if predetermined learning end conditions stand, the learning part 93 ends the learning of the learning model. Here, as the predetermined learning end condition, for example, the amounts of changes of the weights "w" before and after the final changes of the weights being predetermined values or less, the numbers of times of updating the weights "w" reaching predetermined numbers of times, etc. may be mentioned.

At step S102, in the first ECU $61_1$, the vehicle side model transmitting part 94 transmit the first vehicle information including the usage environment and usage state of the first vehicle 110 and the learning model learned by the learning part 93 (specifically, data of weights "w" or biases "b" of learned learning model) linked together through the communicating part 64 of the first ECU $61_1$ to the server 130. The usage environment and usage state of the first vehicle 110 are stored in the storage part 63 of the first ECU $61_1$. The transmission of the first vehicle information and learned learning model in step S102, for example, is performed every time learning of the learning model is completed predetermined numbers of times.

Here, the "usage environment" includes at least one information item data set in accordance with the type of information relating to the environment outside of the vehicle. The usage environment, for example, includes at least one information item data among a usage ratio for each area (prefectures or region etc.), frequency of appearance of the road shape (curvature of curve, grade of road surface (uphill or downhill), etc.), ratio of any congestion at time of use of vehicle, meteorological information (ratio of appearance of each weather, average air temperature, average wind speed, wind direction, etc.), and usage ratio for each block of time (morning, afternoon, evening, etc.). Further, the "usage state" includes at least one information item data set in accordance with the type of information relating to the state inside of the vehicle. The usage state, for example, includes at least one information item data among the average value of the amount of depression of the accelerator pedal 81 at the time of start of motion of the vehicle, the state of activation of headlights, and the state of operation of an air-conditioner.

The usage area, driving route, and road shape are, for example, acquired based on position information acquired from a GPS and the map information stored in the storage part 63. The state of congestion of the road and the meteorological information are for example acquired from congestion information or weather, air temperature, wind speed, wind direction, or other information transmitted from a road traffic information communication system center or other outside communication center. The average value of the amounts of depression of the accelerator pedal 81 is, for example, acquired by the first ECU $61_1$ based on the output value of the load sensor 82. The block of time used at, the on-off state of the headlights, and the state of driving the air-conditioner are, for example, acquired by the first ECU $61_1$.

At step S103, in the server 130, the server storage part 132 stores the first vehicle information and learned learning models received through the server communicating part 131 from the first vehicles 110.

At step S104, in the second ECU $61_2$, the model request transmitting part 95 transmits to the server 130 through the communicating part 64 of the second ECU $61_2$ a model request requesting a learned learning model and second vehicle information including the usage environment and usage state of the second vehicle 120. The usage environment and usage state of the second vehicle 120 are stored in the storage part 63 of the second ECU 61a. The usage environment and usage state at the second vehicle information include information item data similar to the information item data contained in the usage environment and usage state at the first vehicle information. The information item data contained in the usage environment and usage state in this second vehicle information are acquired by a method similar to the information item data contained in the usage environment and usage state in the first vehicle information. Note that, this model request and second vehicle information may also be sent in response to user input to the second vehicle 120 or may be automatically sent each time a predetermined time period elapses.

At step S105, in the server 130, the selecting part 134 selects from among the first vehicle information stored in the server storage part 132 the first vehicle information in which the usage environment and usage state of the first vehicle 110 are the closest to the usage environment and usage state of the second vehicle 120 contained in the second vehicle information received from the second ECU $61_2$. For example, the selecting part 134 converts the usage environments and usage states in the first vehicle information and second vehicle information to vectors using the information item data as vector elements and calculates the distances between these vectors. Specifically, when including the information item data for the usage environments of the average air temperatures and average wind speeds (meteorological information), the selecting part 134, for example, converts the usage environments and usage states in the first vehicle information and second vehicle information to vectors using the average air temperatures and average wind speeds during use of the first vehicle 110 and second vehicle 120 as vector elements and calculates the distances between these vectors. Further, the selecting part 134 selects from the first vehicle information the first vehicle information in which the calculated distance between the vectors is the smallest. The above processing can be realized by known art, and therefore a detailed explanation will be omitted. Note that, the method of selecting this learned learning model is not limited to the one explained above. Other known methods may also be used to select the learned learning model.

At step S106, in the server 130, the server side model transmitting part 135 transmits the learned learning model linked with the first vehicle information selected at the selecting part 134 through the server communicating part 131 to the second ECU $61_2$. Further, the model receiving part 96 of the second ECU $61_2$ receives the learned learning model from the server 130 through the communicating part 64 of the second ECU $61_2$.

At step S107, in the second ECU $61_2$, the second predicted value output part $91_2$ uses the learned learning model received from the server 130 to output the predicted values of the output parameters (in the present embodiment, the predicted value of the torque).

At step S108, in the second ECU $61_2$, the second engine control part $92_2$ uses this learned learning model to control the internal combustion engine 1 based on the predicted values of the output parameters output from the second predicted value output part $91_2$.

Modification

Figure 9:
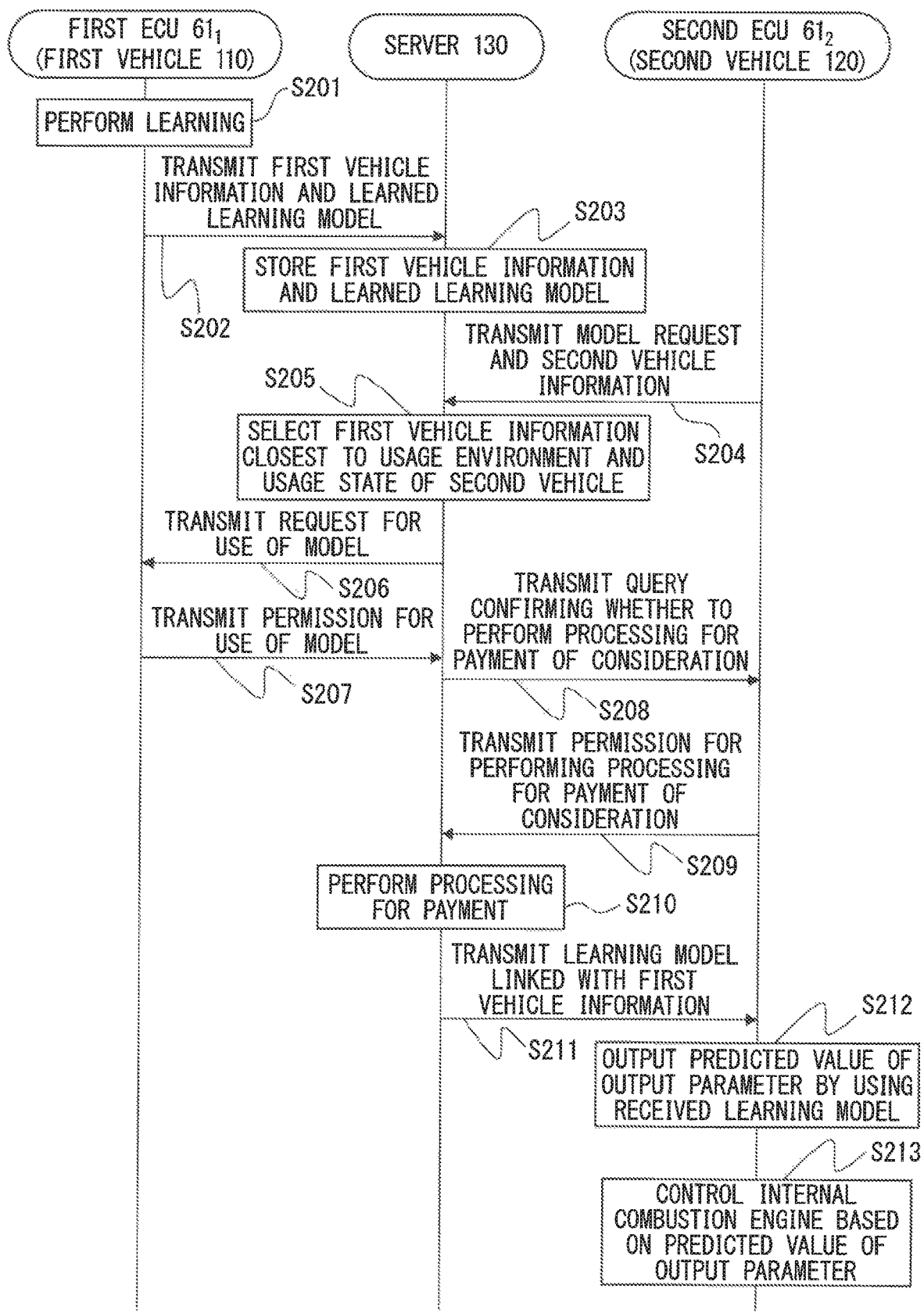
FIG. 9 is a sequence diagram showing one example of processing performed by the control system of an internal combustion engine according to a modification of the first embodiment.

Next, using FIG. 9, a control system of an internal combustion engine according to a modification of the first embodiment will be explained. FIG. 9 is a sequence diagram showing one example of the processing performed by the control system of an internal combustion engine according to this modification. Note that, the control at steps S201 to S205 and S211 to S213 is similar to the control at steps S101 to S108 of FIG. 8, and therefore explanations will be omitted.

At step S206, the server 130 transmits to the first ECU $61_1$ originating the first vehicle information selected at the selecting part 134 a model use request requesting use of the learned learning model linked with that first vehicle information. After the first ECU $61_1$ receives this model use request, for example, a display part (not shown) of the first vehicle 110 displays the fact that the user of the second vehicle 120 has requested use of the learning model learned at the learning part 93 of that first vehicle 110 at another vehicle. After that, the user of the first vehicle 110 judges whether to permit the use of the learned learning model. If the user of the first vehicle 110 inputs by himself the fact of permission for use of that learned learning model through a user input device (not shown) of the first vehicle 110, the first ECU 61₁ performs step S207.

At step S207, the first ECU 61₁ transmits to the server 130 a model use permission showing it permits use of the learned learning model.

Note that, for example, if at the time of purchase of a first vehicle 110, a contract etc. is concluded in advance with the user to the effect of permitting the use by another vehicle of a learning model learned at the learning part 93 of the first ECU 61₁, step S206 and step S207 may be omitted.

At step S208, the server 130 transmits to the second ECU 61₂ a query confirming as to whether to perform processing for payment of the consideration for use of the learned learning model and the amount of the consideration. After the second ECU 61₂ receives the query confirming permission and the amount of the consideration, for example, the display part (not shown) of the second vehicle 120 displays the fact of a response being sought as to whether to permit performance of the processing for payment of the consideration and the amount of the consideration. If the user of the second vehicle 120 inputs by himself the fact of permitting the processing for payment of the consideration through a user input device (not shown) of the second vehicle 120, the second ECU 61₂ performs step S209. Note that, the amount of this consideration is, for example, suitably set at the server 130.

At step S209, the second ECU 61₂ transmits to the server 130 permission for performing processing for paying the consideration by which it permits performance of the processing for payment of the consideration.

Note that, for example, if at the time of purchase of the second vehicle 120, a contract etc. is concluded in advance with the user to the effect of permitting the payment of a consideration for the use of a learning model learned at a control device of another vehicle, step S208 and step S209 may be omitted.

At step S210, the server 130 performs processing for payment of the consideration for use of the learning model learned at the learning part 93 of the first ECU 61₁ from the user of the second vehicle 120 to the user of the first vehicle 110. The processing for payment of the consideration is, for example, performed by bitcoins or other virtual currency. The processing for payment of the consideration may be performed using a known method, and therefore its explanation will be omitted.

Note that, as the method for payment of the consideration, rather than, like at step S209, having the second ECU 61₂ directly pay the consideration to the user of the first vehicle 110, for example, it is also possible to have the user of the second vehicle 130 pay a monthly usage fee to a server administrator operating the server 130 and have the server administrator pay monthly considerations to the user of the first vehicle 110.

After processing for payment of the consideration is completed, the server 130 performs step S211.

Second Embodiment

Next, a control system 200 of an internal combustion engine according to a second embodiment will be explained. Below, parts different from the configuration of the control system 100 of an internal combustion engine according to the first embodiment will be focused on in the explanation.

Figure 10:
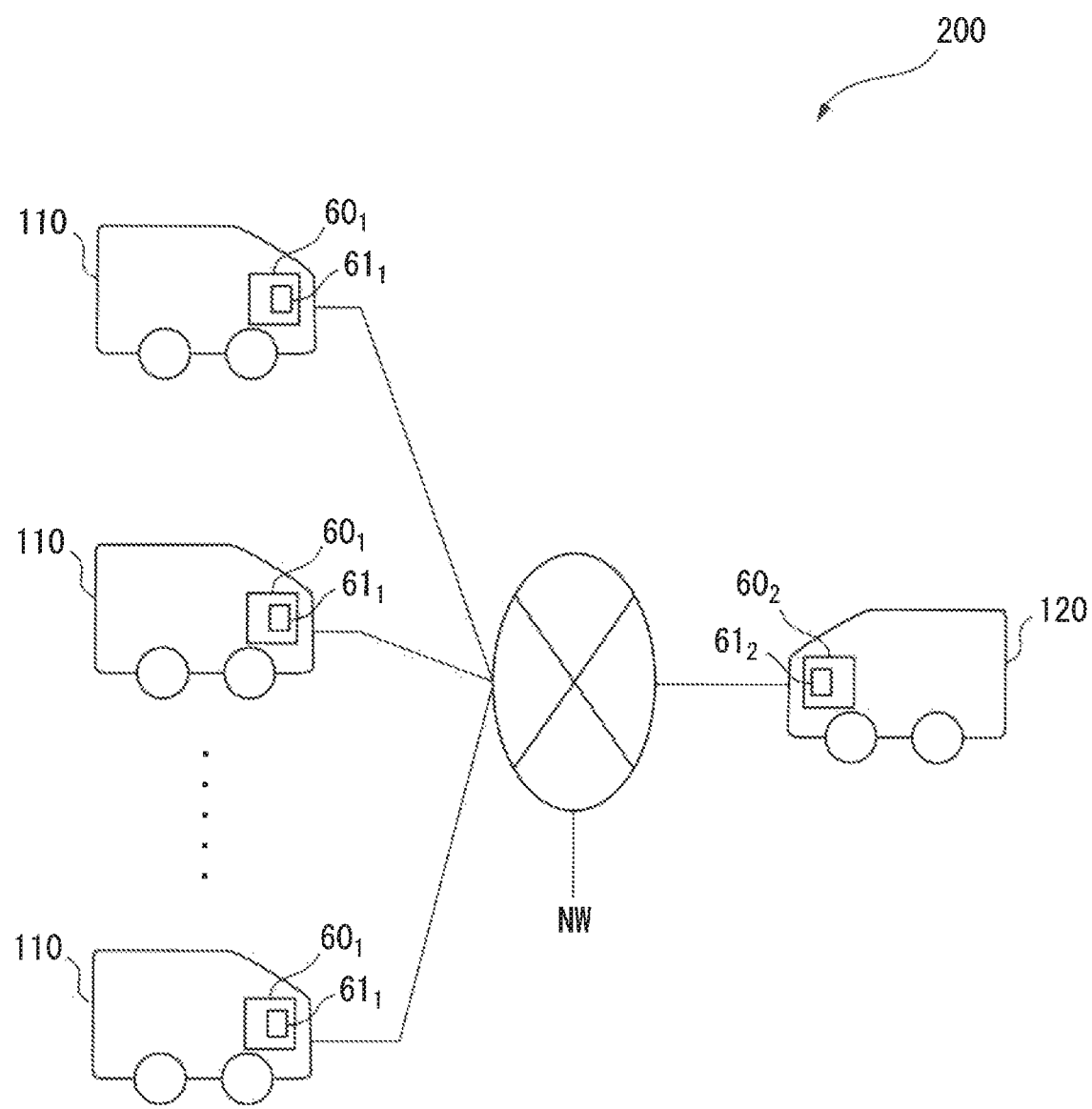
FIG. 10 is a schematic view of the configuration of a control system of an internal combustion engine according to a second embodiment.

FIG. 10 is a schematic view of the configuration of a control system of an internal combustion engine according to the second embodiment. As shown in FIG. 10, the control system 200 according to the present embodiment includes a plurality of first vehicles 110 in which control devices 60₁ of internal combustion engines are mounted and a second vehicle 120 in which a control device 60₂ of an internal combustion engine is mounted. The first ECUs 61₁ of the first vehicles 110 and the second ECU 61₂ of the second vehicle 120 are configured to be able to communicate with each other through the network NW.

Figure 11:
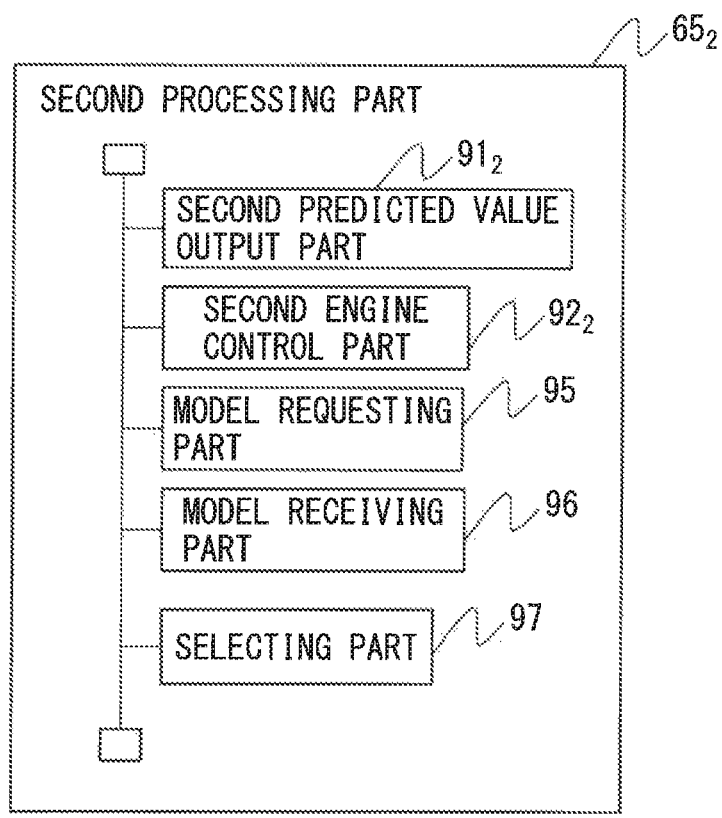
FIG. 11 is a schematic view of the configuration in a second processing part of a second ECU in the second embodiment.

FIG. 11 is a schematic view of the configuration of the second processing part 65₂ of the second ECU 61₂ at the second embodiment. As shown in FIG. 11, the second processing part 65₂ includes, as functional modules, a second predicted value output part 91₂, second engine control part 92₂, model request transmitting part 95, model receiving part 96, and selecting part 97.

Figure 12:
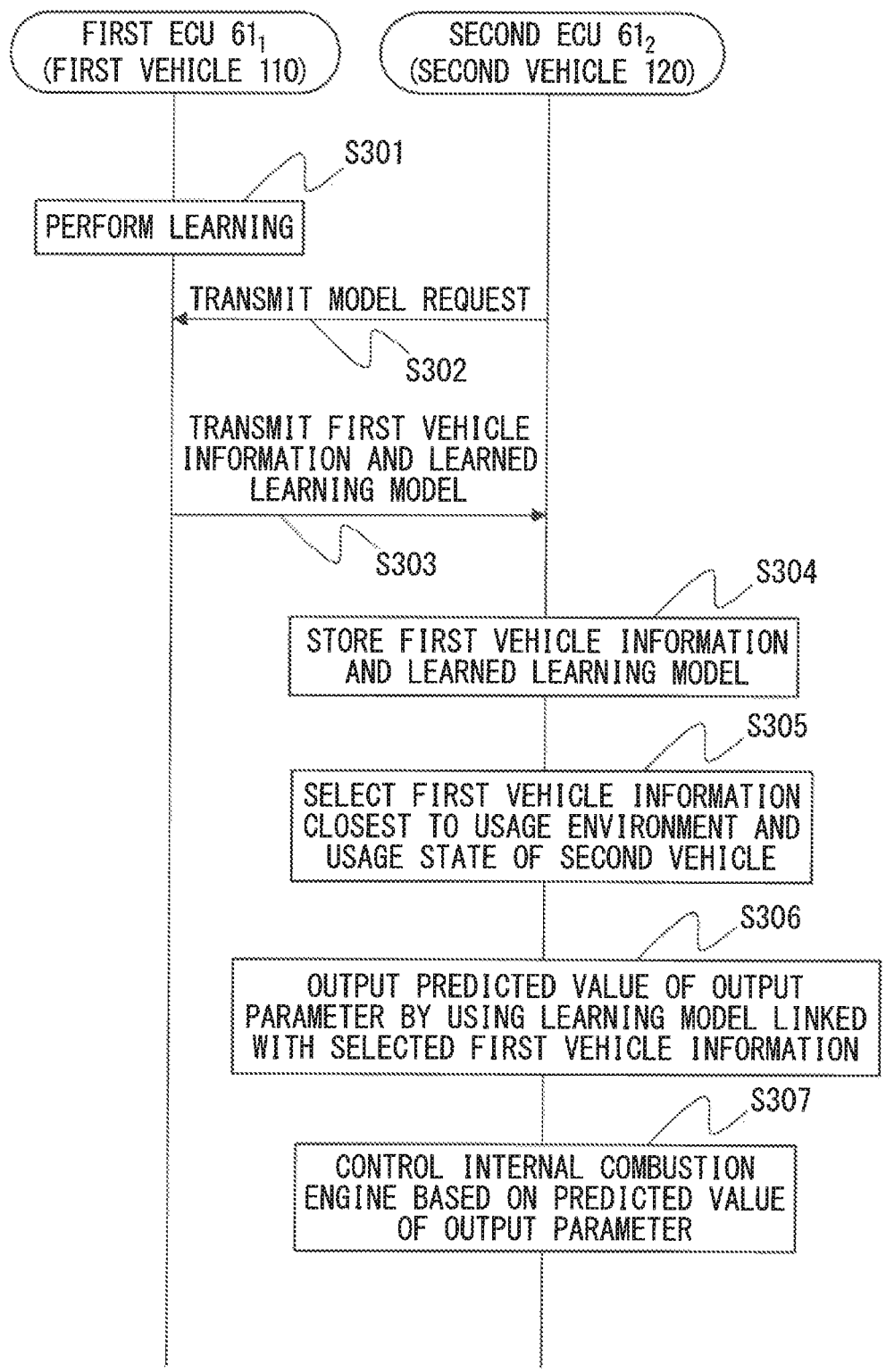
FIG. 12 is a sequence diagram showing one example of processing performed by the control system of an internal combustion engine according to the second embodiment.

FIG. 12 is a sequence diagram showing an example of the processing performed by the control system of an internal combustion engine according to the present embodiment. Note that, the control at steps S301 and S307 is similar to the control at steps S101 and S108 of FIG. 8, and therefore explanations will be omitted.

At step S302, in the second ECU 61₂, a model request transmitting part 95 transmits a model request requesting a learned learning model to the first ECUs 61₁.

At step S303, in the first ECUs 61₁, the vehicle side model transmitting parts 94 respond to the model request and transmit to the second ECU 61₂ first vehicle information and learned learning models linked together. Further, the model receiving part 96 of the second ECU 61₂ receives the first vehicle information and learned learning models from the first ECUs 61₁.

At step S304, in the second ECU 61₂, the storage part 63 stores the first vehicle information and learned learning models received from the first vehicles 110.

At step S305, in the second ECU 61₂, the selecting part 97 selects from among the first vehicle information stored in the storage part 63 of the second ECU 61₂ the first vehicle information closest to the usage environment and usage state of the second vehicle 120 stored in the storage part 63 of the second ECU 61₂. The first vehicle information is selected at step S305 when, for example, after sending a model request, a predetermined number of first vehicle information is stored in the storage part 63 of the second ECU 61₂. The method for selecting this first vehicle information is similar to the method at step S105 of FIG. 8, and therefore explanations will be omitted.

At step S306, in the second ECU 61₂, the second predicted value output part 91₂ uses the learned learning model linked with the first vehicle information selected at the selecting part 97 to output predicted values of the output parameters.

At this time, in the first embodiment, the model receiving part 96 of the second ECU 61₂ receives from the server 130 the learned learning model linked to the first vehicle information in which the usage environment and usage state of the first vehicle 110 are closest to the usage environment and usage state of the second vehicle 120 among the learned learning models learned at the learning part 93 of the first ECUs 61₁. Further, the second predicted value output part 91₂ of the second ECU 61₂ uses this received learned learning model to output predicted values of the output parameters.

On the other hand, in the second embodiment, the model receiving part 96 of the second ECU 61₂ receives the first vehicle information and learned learning models from the first ECUs 61₁. Further, the second predicted value output part 91₂ of the second ECU 61₂ uses the learned learning model linked with the first vehicle information in Which the usage environment and usage state of the first vehicle 110 are closest to the usage environment and usage state of the second vehicle 120 among the received learned learning models, that is, the learned learning models learned at the learning parts 93 of the first ECUs 61, to output predicted values of the output parameters.

Summarizing the above, in the first embodiment and in the second embodiment, the second predicted value output part 91$_2$ of the second ECU 61$_2$ can be said to use the learned learning model linked with the first vehicle information in which the usage environment and usage state of the first vehicle 110 are closest to the usage environment and usage state of the second vehicle 120 among the learned learning models learned at the learning parts 93 of the first ECUs 61$_1$.

Note that, in the above embodiments, the first vehicle information and second vehicle information respectively include the usage environments and usage states of the vehicles, but it is sufficient that at least one of the usage environments and usage states be contained. Further, in the above embodiments, the explanation was given with reference to the example of use of a neural network as the learning model, but another machine learning model may also be used. Further, the above-mentioned method of acquisition of the actually measured values of the parameters is in the end just one example. The actually measured values of the parameters can also be acquired by other methods.

REFERENCE SIGNS LIST 1. internal combustion engine
10. engine body
91. predicted value output part
92. engine control part
93. learning part
94. vehicle side model transmitting part
95. model request transmitting part
96. model receiving part
97, 134. selecting part
135. server side model transmitting part

The invention claimed is:

1. A control system of an internal combustion engine comprising first electronic control units, which have a learning function of a learning model used for controlling the internal combustion engine, mounted in a plurality of first vehicles and a second electronic control unit, which does not have the learning function, mounted in a second vehicle,
    each of the first electronic control units and the second electronic control unit configured to:
    output a predicted value of an output parameter by using a learning model if actually measured values of input parameters are input; and
    control the internal combustion engine based on the output predicted value,
    the first electronic control units configured to:
    learn a learning model used at the first electronic control unit by using teacher data including actually measured values of the input parameters and an actually measured value of the output parameter; and
    transmit first vehicle information including at least one of a usage environment and usage state of the first vehicle and the learned learning model linked with each other, and
    the second electronic control unit configured to receive the learned learning model, and
    wherein the second electronic control unit is configured to use a learned learning model, linked with the first vehicle information in which at least one of the usage environment and usage state of the first vehicle is closest to at least one of the usage environment and usage state of the second vehicle, among the learned learning models learned at the first electronic control units.

2. The control system according to claim 1, wherein the control system further comprises a server configured to be able to communicate with the first electronic control units and the second electronic control unit,
    the second electronic control unit is configured to transmit to the server a model request requesting the learned learning model and second vehicle information including at least one of the usage environment and usage state of the second vehicle, and
    the server is configured to:
    select the first vehicle information in which at least one of the usage environment and usage state of the first vehicle is closest to at least one of the usage environment and usage state of the second vehicle included in the second vehicle information received from the second electronic control unit, among the first vehicle information received from the first electronic control units; and
    transmit the learned learning model linked with the selected first vehicle information to the second electronic control unit.

3. The control system according to claim 1, wherein
    the second electronic control unit is configured to receive the first vehicle information from the first electronic control units,
    the second electronic control unit is configured to select the closest first vehicle information, among first vehicle information received from the first electronic control units, and
    the second electronic control unit is configured to use the learned learning model linked with the selected first vehicle information.

4. An electronic control unit used in a second vehicle of a control system of an internal combustion engine comprising electronic control units, which have a learning function of a learning model used for controlling the internal combustion engine, mounted in a plurality of first vehicles and an electronic control unit, which does not have the learning function, mounted in the second vehicle,
    the electronic control unit of the second vehicle configured to:
    output a predicted value of an output parameter by using a learning model if actually measured values of input parameters are input;
    control the internal combustion engine of the second vehicle based on the output predicted value output; and
    receive the learned learning models learned at the electronic control units of the plurality of first vehicles, and
    wherein the electronic control unit of the second vehicle is configured to use said learned learning model learned at the electronic control unit of the first vehicle in which at least one of a usage environment and usage state is closest to at least one of a usage environment and usage state of the second vehicle, among the learned learning models learned at the electronic control units of the plurality of first vehicles.

5. A server configured to be able to communicate with first electronic control units, which have a learning function of a learning model used for controlling an internal combustion engine, mounted in a plurality of first vehicles and a second electronic control unit, which does not have the learning function, mounted in a second vehicle, the server is configured to:
receive from the first electronic control units first vehicle information including at least one of usage environments and usage states of the first vehicles and learned learning models learned at the first electronic control units and linked with the first vehicle information;
receive from the second electronic control unit a model request requesting the learned learning model and second vehicle information including at least one of a usage environment and usage state of the second vehicle;
select the first vehicle information in which at least one of the usage environment and usage state of the first vehicle is closest to at least one of the usage environment and usage state of the second vehicle included in the received second vehicle information, among the received first vehicle information; and
transmit the learned learning model linked with the selected first vehicle information to the second electronic control unit.

6. A control method of an internal combustion engine in a control system of the internal combustion engine comprising first electronic control units which have a learning function of a learning model used for controlling the internal combustion engine, mounted in a plurality of first vehicles and a second electronic control unit, which does not have the learning function, mounted in a second vehicle,
the control method comprising steps of:
learning, by the first electronic control unit, the learning model used at the first electronic control unit by using teacher data including actually measured values of input parameters of the learning model and actually measured values of output parameters of the learning model;
transmitting, by the first electronic control unit, first vehicle information including at least one of usage environment and usage state of the first vehicle and the learned learning model linked with each other;
receiving, by the second electronic control unit, the learned learning model;
outputting, by the second electronic control unit, a predicted value of an output parameter by using the received learned learning model if actually measured values of input parameters are input; and
controlling, by the second electronic control unit, the internal combustion engine based on the output predicted value,
wherein the step of outputting the predicted value uses the learned learning model, linked with the first vehicle information in which at least one of the usage environment and usage state of the first vehicle is closest to at least one of the usage environment and usage state of the second vehicle, among the learned learning models learned at the first electronic control units.

* * * * *